(12) United States Patent
McFarthing

(10) Patent No.: US 9,906,064 B2
(45) Date of Patent: Feb. 27, 2018

(54) RECEIVER CIRCUIT

(71) Applicant: Qualcomm Technologies International, Ltd., Cambridge (GB)

(72) Inventor: Anthony Lawrence McFarthing, Cambridgeshire (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 729 days.

(21) Appl. No.: 14/492,413

(22) Filed: Sep. 22, 2014

(65) Prior Publication Data

US 2016/0087479 A1 Mar. 24, 2016

(51) Int. Cl.
*H02J 5/00* (2016.01)
*H02J 7/02* (2016.01)
*H02J 17/00* (2006.01)
*H04B 5/00* (2006.01)
*G06K 19/07* (2006.01)

(52) U.S. Cl.
CPC .......... *H02J 7/025* (2013.01); *G06K 19/0723* (2013.01); *H02J 5/005* (2013.01); *H02J 17/00* (2013.01); *H04B 5/0037* (2013.01)

(58) Field of Classification Search
CPC .................. H02J 7/02; H02J 5/00; H04B 5/00
USPC .......................................................... 307/104
See application file for complete search history.

(56) References Cited

U.S. PATENT DOCUMENTS

| 6,778,070 B1 * | 8/2004 | Thomas | G06K 19/0723 340/10.1 |
| 2001/0026186 A1 * | 10/2001 | Watanabe | G06K 19/0701 327/530 |
| 2005/0254183 A1 * | 11/2005 | Ishida | H02M 7/04 361/18 |
| 2011/0316673 A1 * | 12/2011 | Song | G06K 19/07771 340/10.1 |

FOREIGN PATENT DOCUMENTS

| GB | 2307379 | 5/1997 |
| GB | 2484104 A | 4/2012 |

OTHER PUBLICATIONS

International Search Report and Written Opinion—PCT/US2015/051076—ISA/EPO—Jan. 4, 2016.

* cited by examiner

*Primary Examiner* — Jared Fureman
*Assistant Examiner* — Joseph Inge
(74) *Attorney, Agent, or Firm* — Paradice and Li LLP

(57) ABSTRACT

A receiver circuit and a device incorporating a receiver circuit are described, including a receiver circuit comprising a first rectifier arranged to receive a signal from an antenna, a second rectifier arranged to receive the signal from the antenna, and a first depletion mode NMOS transistor switch connected between the first rectifier and a first output of the receiver circuit, wherein a drain of the first transistor switch is connected to a first output of the first rectifier, a source of the first transistor switch comprises the first output of the receiver circuit, and a gate of the first transistor switch is arranged to receive a voltage based on an output of the second rectifier, such that the transistor switch is opened when a level of the signal from the antenna exceeds a predetermined level.

19 Claims, 3 Drawing Sheets

RECEIVER CIRCUIT

TECHNICAL FIELD

Embodiments of the invention described herein relate to wireless charging of electronic devices, for example devices that are near-field communications (NFC) capable devices, and in particular to a receiver circuit operable to protect those devices or other devices from strong electromagnetic fields.

BACKGROUND

Wireless charging of an electronic device is a desirable convenience as the requirement to physically connect the device to a wire, dock or other physical component while charging is removed.

Some devices capable of near-field communications, referred to as near-field communication (NFC) tags or radio frequency identification (RFID) tags, can communicate with tag reader and can also be powered using energy extracted from signals received from the reader device. The tag has an antenna that is resonant at a frequency on which communications are transmitted from the reader in order to be able to receive as much energy as possible from the signal. This allows reliable communication as well as the extraction of power needed to operate the tag.

Some NFC or RFID capable devices may also include a battery so that they can operate when they are not being powered by a reader.

SUMMARY OF EMBODIMENTS OF THE INVENTION

According to a first aspect of embodiments of the invention there is provided a receiver circuit comprising a first rectifier arranged to receive a signal from an antenna, a second rectifier arranged to receive the signal from the antenna, and a first depletion mode NMOS transistor switch connected between the first rectifier and a first output of the receiver circuit, wherein a drain of the first transistor switch is connected to a first output of the first rectifier, a source of the first transistor switch comprises the first output of the receiver circuit, and a gate of the first transistor switch is arranged to receive a voltage based on an output of the second rectifier, such that the transistor switch is opened when a level of the signal from the antenna exceeds a predetermined level.

According to a second aspect of embodiments of the invention, there is provided a device comprising an antenna, a receiver circuit, and a communications circuit, wherein the receiver circuit comprises a first rectifier arranged to receive a signal from an antenna, a second rectifier arranged to receive the signal from the antenna, a first depletion mode NMOS transistor switch connected between the first rectifier and a first output of the receiver circuit, wherein a drain of the first transistor switch is connected to a first output of the first rectifier, a source of the first transistor switch comprises the first output of the receiver circuit, and a gate of the first transistor switch is arranged to receive a voltage based on an output of the second rectifier, such that the transistor switch is opened when a level of the signal from the antenna exceeds a predetermined level. In some embodiments the communications circuit is arranged to accept a signal from the first output of the receiver circuit.

These and/or other features, aspects and embodiments of the invention are described herein and in the appended claims.

BRIEF DESCRIPTION OF THE FIGURES

Embodiments of the invention will now be described by way of example only, in which.

DETAILED DESCRIPTION OF EMBODIMENTS OF THE INVENTION

NFC Wireless Charging (NFC WC) could be used to charge NFC or RFID capable devices that also include a battery. An NFC wireless charging device, which may also be an NFC or RFID reader, may transmit a wireless charging signal with a relatively high power, for example 10 W. NFC and RFID tags (that is, devices that include communications circuits capable of transmitting and/or receiving according to NFC and/or RFID standards) are typically designed to operate at relatively low input powers and low voltages. The large voltages that can be induced in NFC and RFID tags by a charging signal (that is, voltages and power levels significantly higher than that used for communication with the tags) could cause the tags to be damaged or even cause a fire risk, if the tags are not specifically designed to receive or otherwise tolerate such signals. Thus, there is a need to protect NFC and RFID tags and other NFC and RFID devices from negative effects of a wireless charging signal transmitted at NFC/RFID frequencies, for example 13.56 MHz. Specific embodiments described hereinafter refer to NFC tags, but the principles indentified herein can equally be applied to RFID tags and the protection thereof In addition, a charging unit specified in the specific embodiments is a NFC wireless charging unit operating within the frequency range of a NFC or RFID tag (for example at 13.56 MHz), though can be any other type of wireless charging unit or any other source of strong electromagnetic radiation.

Figure 1:
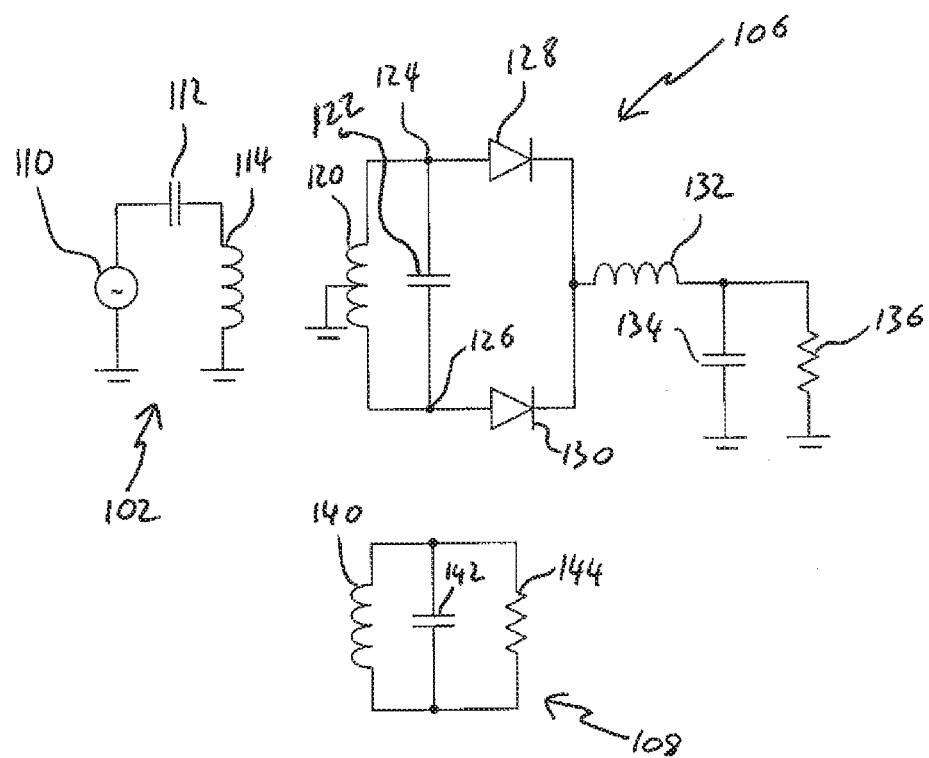
FIG. 1 shows an example of a wireless charging scenario with two devices within range of a wireless charger.

FIG. 1 shows an example of an NFC wireless charging system 100 comprising an NFC wireless charger 102 and an NFC device 106 capable of being charged by an NFC wireless charging signal. Another NFC device 108 is also in the charging field. The NFC wireless charger 102 includes a signal generator 110 for generating the charging signal, and an antenna comprising a capacitor 112 and inductor 114 connected in series between the signal generator 110 and ground. The NFC device 106 includes an antenna comprising an inductor 120 and capacitor 122 connected between nodes 124 and 126. The nodes 124 and 126 are connected to respective rectifiers 128 and 130 which each comprise a half-wave rectifying diode. The outputs of the diodes are provided to a filter comprising inductor 132 and capacitor 134 connected between the diodes and ground. A resistance 136 representing the load (the battery charging circuit) is connected in parallel with the capacitor 134.

The NFC tag 108 includes an antenna comprising an inductor 140 and a capacitor 142 connected in parallel, and a load 144 (representing a NFC communications circuit) connectedin parallel with the capacitor 142. The NFC communications circuit implements required functions of the NFC tag 108 such as communication with an NFC reader and data processing.

When the NFC device 106 is in close proximity to the charger 102, the NFC wireless communications signal can be received by the charging unit and sufficient power extracted therefrom to charge a battery (not shown). However, if the tag 108 is also in close proximity to the charger 102, this may cause large voltages to be induced within the tag 108. As a result, this may damage the tag. The device 108 may be a separate device to the NFC device 106, and thus the charging unit may also include a NFC communications circuit. In other embodiments, the device 108—may form part of a single device with the NFC device 106 and hence be in close proximity to the NFC device 106. In this case, when the charging unit is in close proximity to the wireless charger 102, the device 108 is also in close proximity. In either case, however, and also in the case where the device 108 is within close proximity to the charger 102 without the presence of the NFC device 106, it may be desirable to protect the device 108 from damage by the wireless charging signal.

Figure 2:
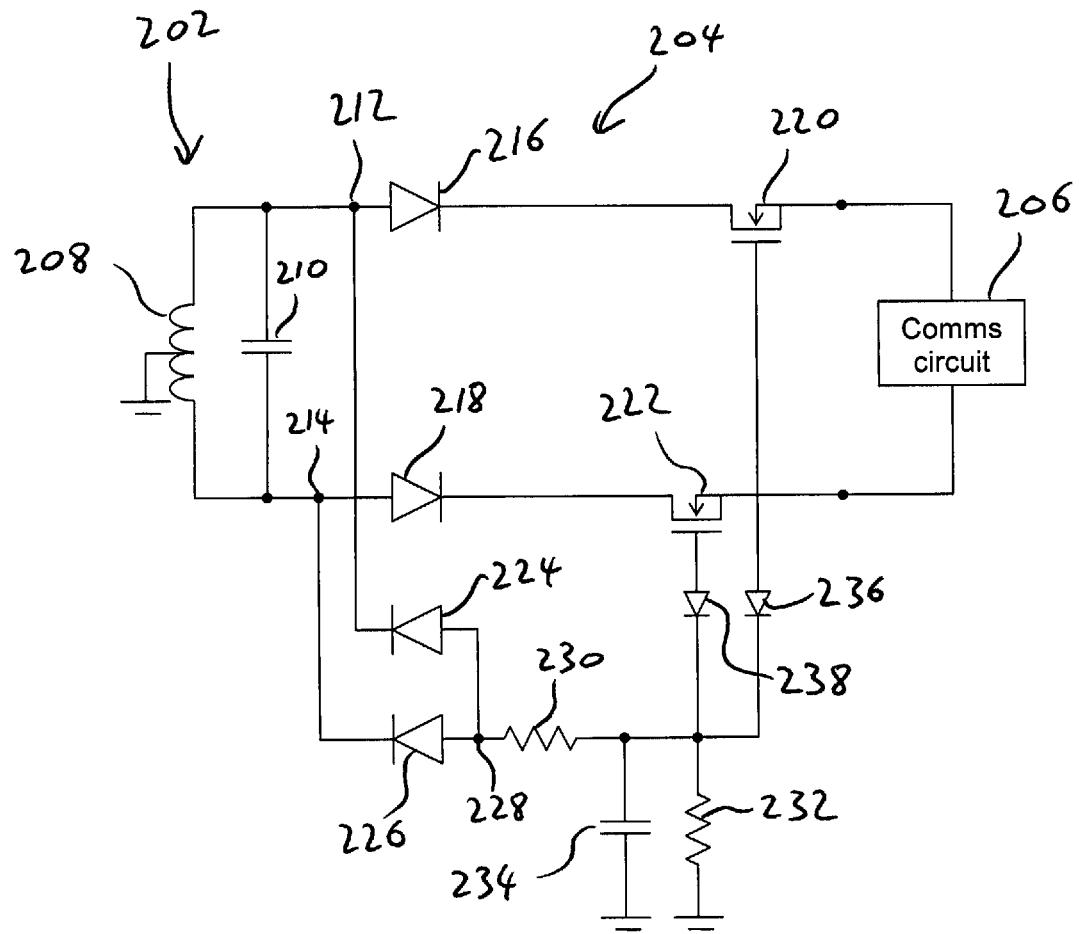
FIG. 2 shows an embodiment of a device such as a NFC or RFID device.

FIG. 2 shows an example embodiment of a device 200 such as a NFC or RFID device. The device 200 includes an antenna, generally indicated as 202, a receiver circuit, generally indicated as 204, and a communications device 206.

The antenna 202 is represented as an inductance 208 in parallel with a capacitance 210. The antenna 202 has a resonant frequency at a frequency of interest, such as 13.56 MHz for example. Other implementations of the antenna 202 are possible in other embodiments. The inductance 208 is shown having a centre tap connected to ground. The antenna 202 receives a signal (for example a NFC RFID communications signal or a wireless charging signal) and provides a differential output on nodes 212 and 214, where the inductance 208 and capacitance 210 are shown connected between the nodes 212 and 214.

The receiver circuit 204 includes a first rectifier comprising diodes 216 and 218. The first diode 216 is connected between the node 212 and the drain of a first transistor 220. The second diode 218 is connected between the node 214 and the drain of a second transistor 222. The cathodes of the diodes 216 and 218 are connected to the respective drains.

The receiver circuit 204 also includes a second rectifier comprising diodes 224 and 226. The diode 224 is connected between a node 228 and the node 212, whereas the diode 226 is connected between the nodes 228 and 214. The anodes of the diodes 224 and 226 are connected to the node 228. A potential divider comprising series resistors 230 and 232 is connected between the node 228 and ground, and the mid-point of the potential divider between the resistors 230 and 232 is connected to the gates of the transistors 220 and 222 (optionally via diodes 236 and 238 respectively, see below). A capacitor 234 is connected between the mid-point of the potential divider and ground.

The sources of the transistors 220 and 222 can be considered as the outputs of the receiver circuit 204 and are shown connected to the communications circuit 206.

The transistors 220 and 222 are depletion mode NMOS transistors, for example IGFETs. That is, the transistors are normally in an "on" state unless a voltage is presented to the gates that is negative enough to turn "off" the transistors, such that the transistors 220 and 222 act as switches that "open" with a negative enough voltage (e.g. the threshold voltage of the transistors). For example, in some embodiments, the voltage required to open the transistor switches is approximately −3V or below relative to ground.

In operation, for example when the device 200 is receiving a NFC or RFID communications signal, which is at a relatively low level compared to a wireless communications signal, the diodes 216 and 218 of the first rectifier each half-wave rectify the received signal from the antenna 202 such that the half-wave signals can be combined to form a substantially full-wave rectified signal. This combination may be performed by the communications circuit 206, or the circuit 206 may use the half-wave signals in other ways, though in other embodiments the receiver circuit 204 may include the means to combine the signals to form a substantially full-wave rectified signal. Thus, the communications circuit receives a rectified version of the received signal. The communications circuit may process the received signal and/or may extract power from the signal in a known manner to power the circuit 206 and/or other circuits. The diodes 216 and 218 are shown connected with a polarity that provides substantially positive rectified signals relative to ground. Although not shown in FIG. 2, the receiver circuit 204 and/or communications circuit 206 may include a filter to smooth the rectified waveform.

The second rectifier comprising diodes 224 and 226 also rectifies the received signal, but as the diodes 224 and 226 are connected in an opposite polarity to the diodes 216 and 218, the second rectifier provides a substantially negative substantially full-wave rectified signal at the node 228. The resistors 230 and 232 and capacitor 234 comprise a potential divider and filter that smoothes the rectified signal and provides a voltage to the gates of the transistors 220 and 222 that is a fraction of the voltage smoothed rectified signal. The resistances of the resistors 230 and/or 232 can be selected to define the fraction that is provided to the gates of the transistors.

This fraction is selected so that in normal operation, when the device is for example receiving a NFC or RFID communications signal, the negative voltage provided to the gates of the transistors 220 and 222 is not large enough in magnitude to open the transistor switches. Therefore, the rectified signals from the diodes pass through the transistors and are provided to the communications device 206. For example, with a transistor with a threshold voltage of −3V, the voltage provided to the gates of the transistors 220 and 222 does not fall below −3V.

When the device 200 receives a wireless charging signal, for example is in close proximity to a wireless charger transmitting a wireless charging signal, the voltage of the rectified signals provided by the first rectifier of the receiver circuit may exceed safe levels for the communications circuit 206 and may damage the communications circuit 206. Therefore, it may be desirable to protect the circuit 206 from damage.

When the level of the received signal increases, the magnitude of the voltage at the gates of the transistors 220 and 222 increases—that is, the voltage becomes more negative. At a certain level of the received signal, the voltage at the gates will reach the threshold voltage of the transistors 220 and 222, such as −3V, relative to the source voltages which do not become substantially negative with respect to ground. The level of the received signal that causes the gate voltage to cross the threshold voltage can be chosen by selecting the resistances of the resistors 230 and/or 232, and can be chosen to ensure that the communications circuit 206 is not presented with damaging voltages. This level can also be chosen so that the transistors switches 220 and 222 do not open in normal operation, which may otherwise interrupt normal communications between the communications device 206 and another device such as a NFC or RFID reader.

When the received signal level is large enough, the transistor switches 220 and 222 are opened, thus preventing large voltages from reaching and damaging the communications circuit 206. Instead, the signals provided to the communications circuit 206 (in the example shown, the voltages at the sources of the transistors 220 and 222) will remain close to the ground voltage or zero volts. While the received signal remains at a high level, the voltage at the gates of the transistors 220 and 222 remains below the threshold voltage and the switches remain open. When the level received signal eventually falls, the gate voltage also decreases in magnitude and when the threshold voltage is crossed again the transistor switches close. The received signal can then be passed to the communications circuit 206 once more without damaging the circuit 206. In this way, the communications circuit 206 is protected from damage by large voltages. The communications circuit 206 does not need to actively monitor the received signal level or take any action to protect itself In particular, the communications circuit 206, which may for example in some embodiments reside on a different integrated circuit (IC) or chip package than other components of FIG. 2, does not require any connections or signal inputs or outputs specifically for monitoring the received signal level or controlling protection components. A wireless charging signal or other relatively high power (e.g. 10 W) signal may cause large voltages to be induced within a device even if the frequency of the signal is offset from the device's resonant frequency, and embodiments may protect a circuit from damage by such signals.

The transistors used in some embodiments may have large parasitic capacitances from drain and source to gate. In these cases, the relatively high frequency signals used in wireless charging, perhaps as large as 13.56 MHz, would be diverted from the input to the communications circuit 206 in FIG. 2 to ground via capacitor 234. Diodes 236, 238 can therefore be inserted in series with the gate of the transistors 220, 222 respectively in some embodiments, as shown in FIG. 2, whereby the IN transfer characteristic ensures the RF resistance at low bias offsets is sufficiently high to reduce RF bypass effects.

The NFC or RFID device described herein may be used in place of the NFC tag 108 shown in FIG. 1. Therefore, in some embodiments, an NFC wireless charging unit and an NFC device may coexist in close proximity to each other (for example as part of a single device) without the risk of an NFC wireless charging signal damaging the NFC device. In other embodiments, the principles described herein for the protection of circuits may be applied to other communication technologies other than RFID and NFC.

In some embodiments, when a high power NFC wireless charging signal is received at the antenna, a high voltage signal can be produced at the outputs of the rectifiers. Therefore, in some embodiments, this signal may be provided to an NFC wireless charging unit and used by the unit to charge a battery, for example. Therefore, in some embodiments, the wireless charging unit and the NFC device may share a single antenna, reducing the number of antennas compared to an arrangement such as that shown in FIG. 1.

Figure 3:
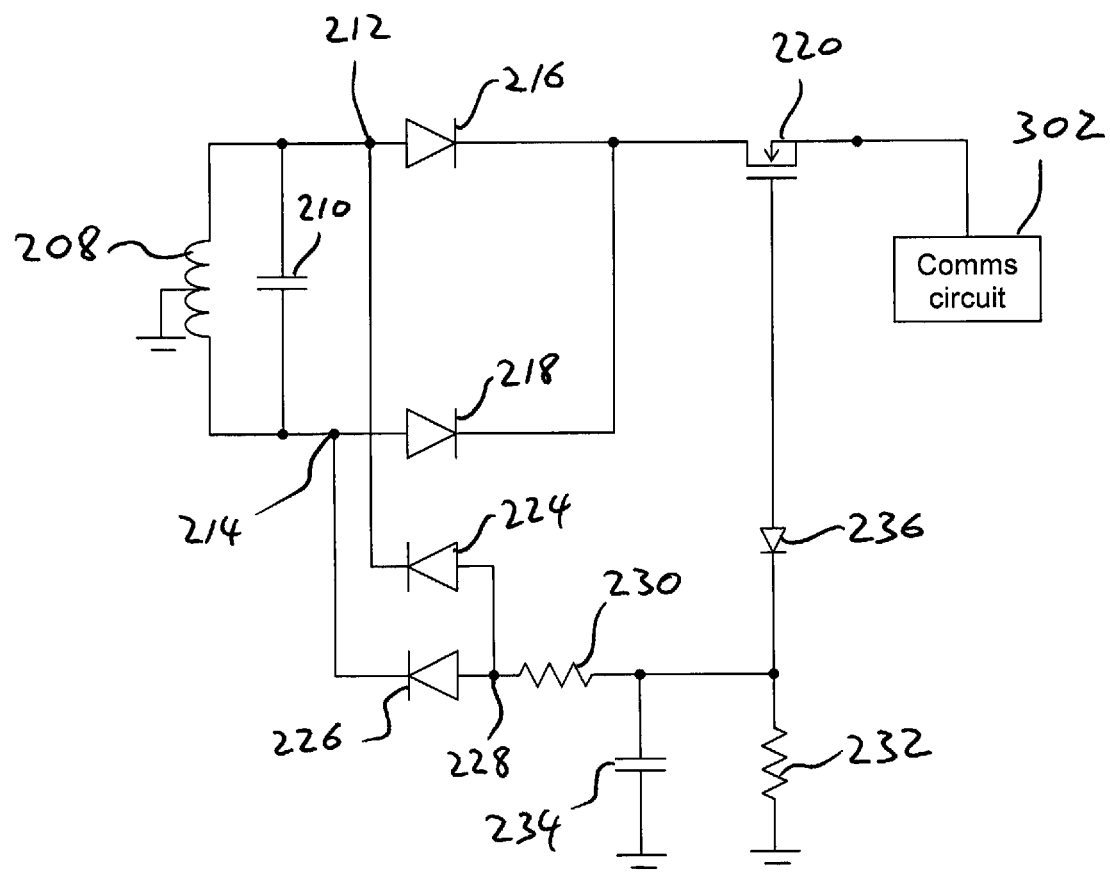
FIG. 3 shows another embodiment of a device such as a NFC or RFID device.

FIG. 3 shows an alternative embodiment of a device 300 that includes a communications circuit 302 that uses a single ended input to enables the external component count to be reduced, thus reducing the cost to manufacture. The device 300 includes several components common to the device 200 of FIG. 2, such components being given like reference numerals. However, in the example shown in FIG. 3, the output of diode 218 is connected to the output of the diode 216 and to the drain of the transistor 220. Transistor 222 and optional diode 238 are not present in this example. The source of transistor 220 is connected to the only input of the single-ended communications circuit 302. The operating principles of the device 300 are similar to those described above with reference to the device 200 of FIG. 2.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

Although methods, devices and electronic components have been disclosed in the context of certain preferred embodiments and examples, it will be understood by those skilled in the art that this disclosure extends beyond the specifically disclosed embodiments to other alternative embodiments and/or uses and modifications and equivalents thereof In addition, while several variations have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the disclosed embodiments. Thus, it is intended that the scope of the present invention herein disclosed should not be limited to the particular disclosed embodiments described above, but should be determined by a fair reading of the claims that follow.

What is claimed is:

1. A receiver circuit comprising:
   a first rectifier configured to receive a signal from an antenna;
   a second rectifier configured to receive the signal from the antenna;
   a first transistor connected between the first rectifier and a first output of the receiver circuit, the first transistor including a drain connected to a first output of the first rectifier, a source connected to the first output of the receiver circuit, and a gate to receive a voltage based on an output of the second rectifier, wherein the first transistor is configured to be in an open state when a level of the signal from the antenna exceeds a predetermined level; and a second transistor connected between the first rectifier and a second output of the receiver circuit, the second transistor including a drain connected to the second output of the first rectifier, a source connected to the second output of the receiver circuit, and a gate to receive the voltage, wherein the second transistor is configured to be in the open state when the level of the signal from the antenna exceeds the predetermined level.

2. The receiver circuit of claim 1, further comprising a circuit configured to provide the voltage to the gate of the first transistor.

3. The receiver circuit of claim 2, wherein the circuit comprises at least one of a filter and a potential divider coupled between the output of the second rectifier and the gate of the first transistor.

4. The receiver circuit of claim 1, wherein the first rectifier comprises a full-wave rectifier.

5. The receiver circuit of claim 1, wherein the signal is a differential signal comprising a first antenna signal and a second antenna signal, and the first rectifier comprises:
 a first diode connected between a first node and the drain of the first transistor; and
 a second diode connected between a second node and the drain of the second transistor.

6. The receiver circuit of claim 5, wherein the second rectifier comprises:
 a third diode connected between the first node and the output of the second rectifier; and
 a fourth diode connected between the second node and the output of the second rectifier.

7. The receiver circuit of claim 1, wherein the gate of the first transistor is coupled to the gate of the second transistor.

8. The receiver circuit of claim 1, wherein the second rectifier comprises a full-wave rectifier.

9. The receiver circuit of claim 1, wherein the first rectifier is configured to provide a substantially positive voltage relative to a ground voltage, and the second rectifier is configured to provide a substantially negative voltage relative to the ground voltage.

10. The receiver circuit of claim 1, wherein the first output of the receiver circuit is coupled to a communications circuit.

11. The receiver circuit of claim 10, wherein the communications circuit is at least one of a near-field communications (NFC) circuit and a radio frequency identification (RFID) circuit.

12. The receiver circuit of claim 1, wherein the voltage is configured to transition the first transistor to the open state when the signal received by the antenna is a wireless charging signal.

13. The receiver circuit of claim 1, wherein the first and second transistors comprise depletion mode NMOS transistors.

14. The receiver circuit of claim 5, wherein the first node is configured to receive the first antenna signal, and the second node is configured to receive the second antenna signal.

15. The receiver circuit of claim 6, wherein the first node is connected to an anode of the first diode and to a cathode of the third diode, and the second node is connected to the anode of the second diode and to the cathode of the fourth diode.

16. A device, comprising:
 an antenna;
 a communications circuit; and
 a receiver circuit comprising:
  a first rectifier configured to receive a signal from an antenna;
  a second rectifier configured to receive the signal from the antenna;
  a first transistor connected between the first rectifier and a first output of the receiver circuit, the first transistor including a drain connected to a first output of the first rectifier, a source connected to the first output of the receiver circuit, and a gate to receive a voltage based on an output of the second rectifier, wherein the first transistor is configured to be in an open state when a level of the signal from the antenna exceeds a predetermined level; and
  a second transistor connected between the first rectifier and a second output of the receiver circuit, the second transistor including a drain connected to the second output of the first rectifier, a source connected to the second output of the receiver circuit, and a gate to receive the voltage, wherein the second transistor is configured to be in the open state when the level of the signal from the antenna exceeds the predetermined level.

17. The device of claim 16, wherein the communications circuit is at least one of a near-field communications (NFC) circuit and a radio frequency identification (RFID) circuit.

18. The device of claim 16, wherein the voltage is configured to transition the first transistor to the open state when the signal received by the antenna is a wireless charging signal.

19. The receiver circuit of claim 16, wherein the first and second transistors comprise depletion mode NMOS transistors.

* * * * *